(12) United States Patent
Kulenko et al.

(10) Patent No.: US 11,178,938 B2
(45) Date of Patent: Nov. 23, 2021

(54) METHOD FOR PRODUCING INDIVIDUALIZED LAST FOR PERSONALIZED FITTING AND SHAPING OF THE INNER SURFACE OF A SHOE

(71) Applicant: Aleksandr Vladimirovich Kulenko, Moscow (RU)

(72) Inventors: Aleksandr Vladimirovich Kulenko, Moscow (RU); Evgeniya Aleksandrovna Fialkova, Vologodskaya (RU); Vladimir Georgievich Kulenko, Vologodskaya (RU); Georgij Vladimirovich Kulenko, Vologodskaya (RU)

(73) Assignee: Aleksandr Vladimirovich Kulenko, Moscow (RU)

( * ) Notice: Subject to any disclaimer, the term of this patent is extended or adjusted under 35 U.S.C. 154(b) by 0 days.

(21) Appl. No.: 16/765,659

(22) PCT Filed: Nov. 13, 2018

(86) PCT No.: PCT/RU2018/000741
§ 371 (c)(1),
(2) Date: May 20, 2020

(87) PCT Pub. No.: WO2019/132718
PCT Pub. Date: Jul. 4, 2019

(65) Prior Publication Data
US 2020/0315300 A1    Oct. 8, 2020

(30) Foreign Application Priority Data
Dec. 27, 2017   (RU) .......................... RU2017146362

(51) Int. Cl.
*A43D 1/02*  (2006.01)
*A43D 3/02*  (2006.01)
*B33Y 10/00*  (2015.01)

(52) U.S. Cl.
CPC ................ *A43D 1/02* (2013.01); *A43D 3/02* (2013.01); *A43D 2200/60* (2013.01); *B33Y 10/00* (2014.12)

(58) Field of Classification Search
CPC ........ A43D 1/02; A43D 3/02; A43D 2200/60; B33Y 10/00
See application file for complete search history.

(56) References Cited

U.S. PATENT DOCUMENTS 565,341 A * 8/1896 Fletcher .................. A43D 3/08
  12/117.2
657,814 A * 9/1900 Crozier ................ B65D 39/084
  220/259.4

(Continued)

FOREIGN PATENT DOCUMENTS

CH        708582 A2     3/2015
CN      205233626 U     5/2016
(Continued)

OTHER PUBLICATIONS

International Search Report of PCT/RU2018/000741 dated Feb. 21, 2019, 3 pages.

(Continued)

*Primary Examiner* — Katharine G Kane
(74) *Attorney, Agent, or Firm* — Brooks Kushman P.C.

(57) ABSTRACT

A method of producing a customized shoe last for individual fitting and shaping of the inner surface of the shoe includes production of a shoe last based on a precise shape and size of the digital foot model. The actual physical shape of the foot is converted into a foot model using 3D scanning. The digital foot model is divided into parts required for insertion (Continued)

Figure 1:
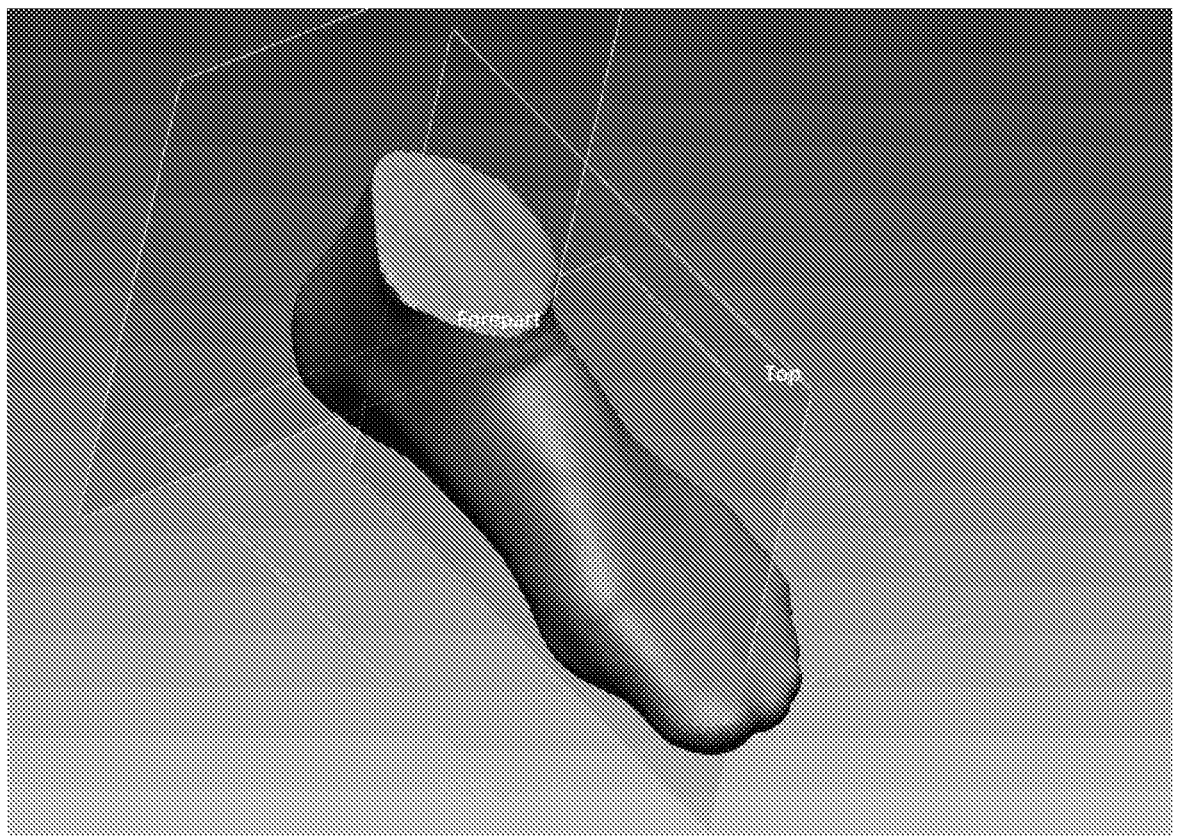

and functioning of a mechanism, and simulation of the bend in the metatarsophalangeal and ankle joints. The parts of the foot obtained by dividing the digital model are then manufactured. An extendable mechanism to move the parts of the shoe last against each other in three axes of coordinates is developed, based the produced parts, an individual shoe last is manufactured in the form of a physical foot model, configured for personal fitting and shaping of an inner surface of the shoe.

15 Claims, 3 Drawing Sheets

(56) References Cited

U.S. PATENT DOCUMENTS

| | | | | |
|---|---|---|---|---|
| 871,150 | A * | 11/1907 | Smith | A43D 3/02 12/133 R |
| 907,693 | A * | 12/1908 | Holbrook | A43D 3/02 12/136 B |
| 1,051,581 | A * | 1/1913 | Heilbrunn et al. | A43D 3/02 12/133 R |
| 1,499,758 | A * | 7/1924 | Babcock | B29D 35/0027 12/137 |
| 1,553,353 | A * | 9/1925 | Bates | A43D 3/06 12/136 R |
| 1,691,054 | A * | 11/1928 | Eliagalterio | A43D 3/08 12/116.2 |
| 1,703,877 | A * | 3/1929 | Fritz | A43D 3/02 12/136 R |
| 1,753,857 | A * | 4/1930 | Eliagalterio | A43D 3/1458 12/116.2 |
| 1,813,378 | A * | 7/1931 | Barna | A43D 3/02 12/137 |
| 2,062,557 | A * | 12/1936 | Georgec | A43D 3/023 12/136 R |
| 2,445,791 | A * | 7/1948 | Lovell | A43D 3/02 12/136 R |
| 2,896,229 | A * | 7/1959 | Doherty | B29D 35/0072 12/1 G |
| 3,501,793 | A * | 3/1970 | Jonas | A43D 3/023 12/136 R |
| 3,657,755 | A * | 4/1972 | Holmes | A43D 3/02 12/136 B |
| 3,696,456 | A * | 10/1972 | Dunham | A43D 119/00 12/146 L |
| 4,512,052 | A * | 4/1985 | Bruno | A43D 3/08 12/116.2 |
| 4,817,222 | A * | 4/1989 | Shafir | G05B 19/4207 12/146 L |
| 6,170,177 | B1 * | 1/2001 | Frappier | A43B 7/28 12/142 R |
| 8,005,558 | B2 * | 8/2011 | Waatti | B33Y 50/00 700/98 |
| 9,107,479 | B2 * | 8/2015 | Hanson | A43D 3/04 |
| 10,013,803 | B2 * | 7/2018 | Shepherd | G06T 19/20 |
| 10,383,405 | B2 * | 8/2019 | Berger | G06T 3/60 |
| 2003/0046778 | A1 * | 3/2003 | Sicurelli, Jr. | A43D 3/1433 12/128 H |
| 2007/0033750 | A1 * | 2/2007 | Cook | A43D 3/1458 12/134 |
| 2010/0229422 | A1 * | 9/2010 | Goonetilleke | A43D 1/02 36/43 |
| 2011/0277250 | A1 * | 11/2011 | Langvin | A43D 3/1408 12/133 R |
| 2012/0053490 | A1 * | 3/2012 | Smith | A61B 5/0082 600/592 |
| 2012/0304492 | A1 * | 12/2012 | Leung | A43D 3/02 36/83 |
| 2012/0316827 | A1 * | 12/2012 | Wilkinson | G01B 21/20 702/150 |
| 2013/0291317 | A1 * | 11/2013 | Hanson | A43B 3/0084 12/133 R |
| 2014/0223671 | A1 * | 8/2014 | Fisher | A43B 23/0255 12/133 R |
| 2016/0166011 | A1 * | 6/2016 | Bruce | A43D 1/025 12/51 |
| 2017/0249783 | A1 * | 8/2017 | Shepherd | G06T 19/20 |
| 2017/0280828 | A1 * | 10/2017 | Berger | G06T 3/60 |
| 2018/0014609 | A1 * | 1/2018 | Bruce | A43B 23/0205 |
| 2018/0271216 | A1 * | 9/2018 | La O' | A43D 95/02 |

FOREIGN PATENT DOCUMENTS

| | | |
|---|---|---|
| GB | 1475405 A | 6/1977 |
| RU | 2014114632 A | 10/2015 |
| RU | 2596107 C1 | 8/2016 |

OTHER PUBLICATIONS

Written Opinion of PCT/RU2018/000741 dated Feb. 21, 2019, 3 pages.

* cited by examiner

METHOD FOR PRODUCING INDIVIDUALIZED LAST FOR PERSONALIZED FITTING AND SHAPING OF THE INNER SURFACE OF A SHOE

CROSS-REFERENCE TO RELATED APPLICATION

This application is the U.S. national phase of PCT Application No. PCT/RU2018/000741 filed on Nov. 13, 2018, which claims priority to Russian Patent Application No. RU2017146362 filed on Dec. 27, 2017, the disclosures of which are incorporated in their entirety by reference herein.

The invention relates to the footwear industry, in particular, to production of customized shoe lasts that allow the inner surface of the shoe to be adjusted and shaped to fit the individual characteristics of the foot.

The prior art discloses the method of producing a customized shoe last. It uses deformable materials, which get in close contact with the foot and produce the precise shape of the foot. Casting heat-curing or thermoplastic materials in a mould results in a shape of the shoe last that matches the shape of the foot (see patent of the UK, No. 1475405, published on Jan. 6, 1977, IPC class: A43D 1/00).

The technical problem lies in the high labor intensity of the production of the shoe last, due to the large number of operations, and the difficulty of ensuring the match of the last with the actual shape and size of the foot, as well as the high complexity of the existing shoe lasts for personal fit and shaping of the inner surface of the shoe.

The purpose of this invention is to eliminate the above deficiencies.

The technical result is to simplify the production of the shoe last, and to ensure that the shoe last matches the actual shape and size of the foot, as well as to facilitate the use of the shoe last for personal fitting and shaping the inner surface of the shoe.

The technical result is achieved by the fact that the method of production of the shoe last for individual fitting and shaping of the inner surface of the shoe includes the production of an individual shoe last based on the exact shape and size of the foot. The actual physical shape of the foot is converted into a digital foot model using 3D scanning. The digital model is processed to obtain a personalized digital foot model. The digital model is divided into parts necessary for the insertion and functioning of the mechanism, and bends of the metatarsophalangeal articulation and/or ankle joints are simulated. The parts obtained after processing the digital foot model are then manufactured. A mechanism built into the shoe last is developed to move the parts of the shoe last relative to each other in three axes of coordinates, based on which and using the manufactured parts, an individual shoe last is created and configured for personal fitting and shaping of an inner surface of the shoe in the form of a physical foot model for a particular foot.

According to the particular embodiments of the invention, the method has the following characteristics.

During production of the personalized digital model, depending on sensitivity or physiological features of a foot, or pathologies of a human body, the size of digital model can be increased or reduced in toe area, the metatarsophalangeal articulation, the bridge of the foot or in the heel, the foot shape can be smoothed to remove concavities of the digital model surface.

The digital foot model is divided by surfaces, constructed on dimensional points of the mechanism components, a row of surfaces and planes, necessary for functioning of the mechanism and surfaces of conjugation, imitating the joints of the foot.

A built-in mechanism is individually designed for a specific digital foot model with a muscular mechanical, and/or pneumatic, and/or hydraulic, and/or electric, and/or electromagnetic drive that secures and moves parts of the foot model relative to each other in three axes of coordinates;

The parts obtained by separating the digital foot model by 3D printing and/or machine cutting, and/or plastic deformation, and/or deforming cutting and/or electrophysical machining, are then manufactured.

The manufactured parts of the digital foot model and the built-in mechanism are assembled to move parts of the shoe last relative to each other in three axes of coordinates, while securing the parts of the model relative to each other by connecting to the mechanism to obtain an individual shoe last configured for personal fitting and shaping of the inner surface of the shoe.

Figure 2:
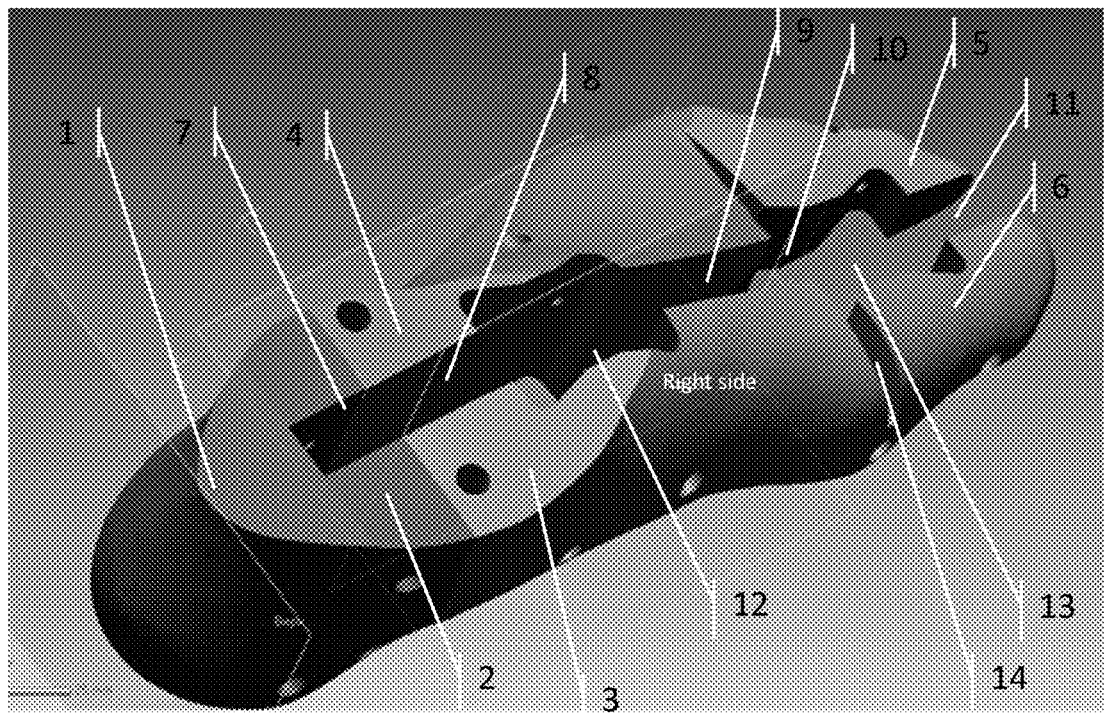
Figure 3:
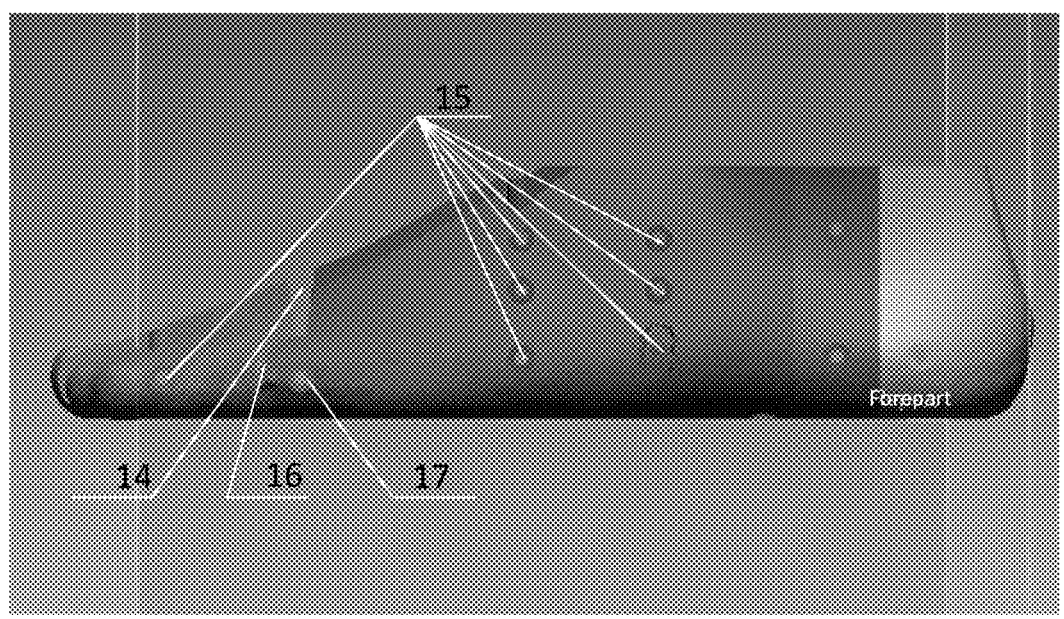
Figure 4:
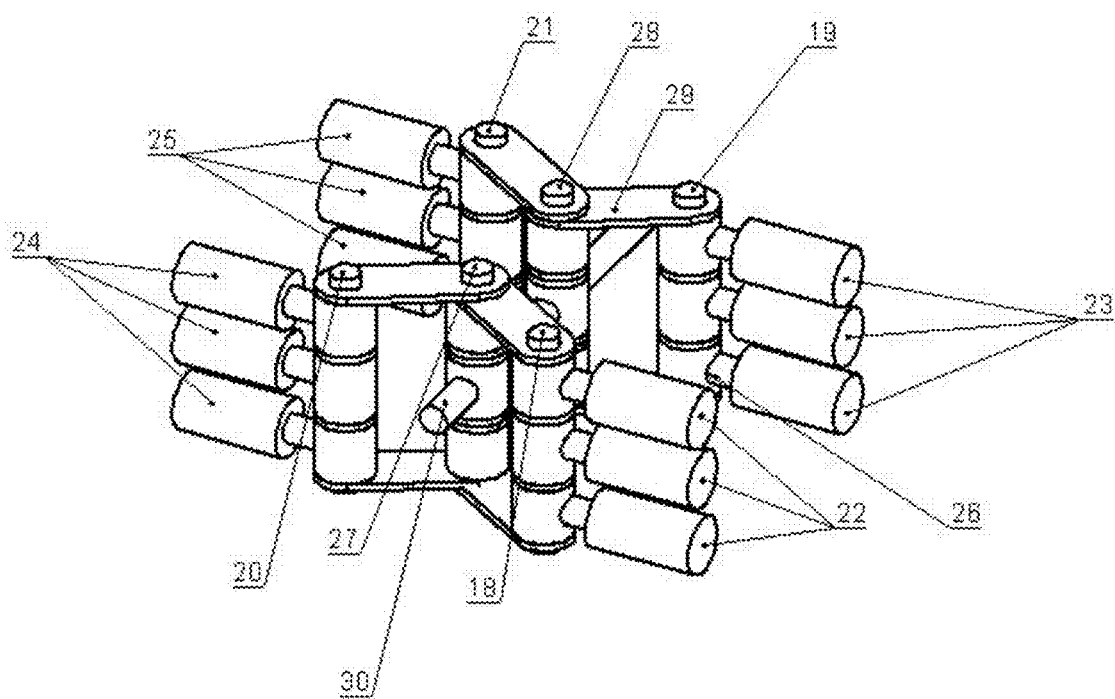

This invention is explained by the following illustrations:
FIG. 1—3D scanning digital model;
FIG. 2—principle of plane division of the model;
FIG. 3—principle of plane division of the model;
FIG. 4—extendable mechanism.

The method of producing an individual shoe last for fitting and shaping the inner surface of the shoe includes production of a shoe last that represents the precise shape and size of the foot. The actual physical shape of the foot is converted into a digital foot model using 3D scanning. The digital foot model is divided by surfaces, constructed on dimensional points of the mechanism components, a row of rotation surfaces, spherical surfaces and planes, necessary for functioning of the mechanism, and cylindrical surfaces, imitating the joints of the foot.

A built-in mechanism is individually designed for a specific digital foot model with a mechanical drive that secures and moves parts of the foot model relative to each other in three axes of coordinates.

The mechanism has a "minimum" position, wherein the size of the individual shoe last is reduced in circumference, length and width, which facilitates the insertion of the model in the shoe, and "working" position in which the individual shoe last is identical to the size of the digital foot model and which involves adjustment by increasing or decreasing the size of the individual block in circumference.

The parts of the digital foot model are manufactured by 3D printing and subsequent machining, surface grinding.

The parts are secured relative to each other by connecting to the mechanism to produce an individual shoe last configured for personal fitting and shaping of the inner surface of the shoe.

The method is implemented as follows.

3D scanning results in a digital foot model, FIG. 1, which in this case corresponds to the digital foot model.

FIG. 2 shows the principle of division of the digital foot model. The model is cut into six parts (1-6) by vertical planes (FIG. 2). Parts 2, 3, 4, 5 and 6 have holes 7, 8, 9, 10, 11 for installation and operation of the mechanism. Holes 12 and 13 are used to secure the extendable mechanism. The gap 14 between parts 3, 4 and 5 is wedge-shaped to provide an imitation of the metatarsophalangeal articulation.

FIG. 3 shows the lateral-side view. 15 are holes to secure the extendable mechanism. 16 are cylindrical conjugation surfaces between parts 4, 5 and 3 and 6 parts of the foot model and imitate the metatarsophalangeal articulation (FIG. 2). The hole 17 (FIG. 3) is used to place the shafts, which are bent to simulate the metatarsophalangeal articulation, between the parts 5 and 6 of the digital foot model. (FIG. 2). In turn, the shafts installed in these holes are also parts of the extendable mechanism.

FIG. 4 shows the extendable mechanism. Vertical cylinders 18, 19, 20, 21 of the extendable mechanism are inserted in holes 2 and 13 (FIG. 2) of the foot model, respectively, and secured there with twelve horizontal cylinders 22, 23, 24, 25 (FIG. 4), with all vertical cylinders being composite and consisting of three parts. Horizontal cylinders are inserted in in cylindrical holes 15 (FIG. 3) and rigidly fastened to each of the three parts of the vertical cylinders using a threaded connection 26 (FIG. 4).

The vertical shaft 28 is connected to the vertical shafts 19 and 21 with four plates, providing horizontal movement of the shafts relative to each other. Similarly, the shaft 27 is connected to shafts 18 and 20. The horizontal connecting shaft 30 passes through the middle part of shafts 27 and 28 and perpendicularly to them, with half of the shaft having a right-handed thread, and the other half having the left-handed thread, so that when the shaft rotates, the vertically secured shafts 27 and 28 either shift, reducing the gap between parts 3 and 4 (FIG. 2), or increase it. This movement allows reducing the volume of the model when inserting it in the shoe, or increasing it while stretching the shoe. Composite design of vertical cylinders allows them to rotate when moving vertical shafts 27 and 28 relative to horizontal shaft 30. A similar stretching mechanism is located at the forepart of the model. The principle of its work is similar to that described above. The only difference is that its height is reduced. Vertical cylinders only consist of one part. The horizontal shafts of both parts of the extendable mechanism are connected to each other by a flexible shaft, which allows the forepart of the model to move relative to the middle part in an angular direction.

The invention claimed is:

1. A method of producing a shoe last for individual fitting and shaping of the inner surface of the shoe, comprising:
production of an individual shoe last based on a precise shape and size of the digital foot model, wherein the actual physical shape of the foot is converted into a foot model using 3D scanning, the digital model is processed to obtain a personalized digital foot model, the digital foot model is divided into parts required for insertion and functioning of a mechanism, and bends in the metatarsophalangeal and ankle joints are simulated, the parts of the foot obtained by dividing the digital model are manufactured, an extendable mechanism is developed for moving the shoe parts relative to each other, wherein the extendable mechanism comprises vertical cylinders, which are arranged with the possibility of installation in the recesses of the model of the foot and fixing them with the help of horizontal cylinders, wherein the extendable mechanism includes vertical and horizontal shafts connected with the vertical cylinders and made with the possibility of their rotation, in which the vertically fixed cylinders are moved, based on which and using the produced parts, an individual shoe last is manufactured in the form of a physical foot model, configured for personal fitting and shaping of an inner surface of the shoe in the form of a physical foot model for a particular foot.

2. The method of claim 1, wherein the process of producing a personalized digital foot model, depending on sensitivity or physiological features of a foot, or pathologies of a human body, the size of digital model can be increased or reduced in toe area, in the metatarsophalangeal articulation, in the bridge of the foot or in the heel.

3. The method of claim 1, wherein in the process of producing a personalized digital foot model, its surface can be smoothed to remove concavities.

4. The method of claim 3, wherein the digital foot model is divided by surfaces, constructed on dimensional points of the mechanism components, a row of surfaces and planes, necessary for functioning of the mechanism and surfaces of conjugation, imitating the joints of the foot.

5. The method of claim 4, wherein the parts obtained by separating the digital foot model by 3D printing and/or machine cutting, and/or plastic deformation, and/or deforming cutting and/or electrophysical machining, are then manufactured.

6. The method of claim 5, wherein the manufactured parts of the digital foot model and the extendable mechanism are assembled to move parts of the shoe last relative to each other in, while securing the parts of the model relative to each other by connecting to the mechanism to obtain an individual shoe last configured for personal fitting and shaping of the inner surface of the shoe.

7. A method of producing a shoe last for individual fitting and shaping of an inner surface of the shoe, the method comprising:
3D scanning a user's foot to obtain a digital a personalized digital foot model;
defining a digital recess withing the digital foot model, wherein the digital recess divides the digital foot model into a plurality of digital parts based on a vertical plane and a metatarsophalangeal joint extending transverse to the vertical plane;
manufacturing a plurality of shoe-last parts based on the plurality of digital parts to obtain a physical foot model;
inserting a extendable mechanism in a physical recess between the plurality of shoe-last parts, the extendable mechanism comprising:
vertical cylinders and horizontal cylinders connected to the shoe-last parts;
vertical and horizontal shafts connected with the vertical cylinders and rotatable to move the vertical cylinders,
wherein the extendable mechanism moves the shoe-last parts relative to each other for personal fitting and shaping of an inner surface of the shoe.

8. The method of claim 7, further comprising modifying the personal digital foot model by increasing or decreasing at least one of a toe area, the metatarsophalangeal joint, a bridge or a heel a personalized digital foot model depending on at least one of a user's sensitivity, or physiological features of the user's foot, or pathologies of a human body.

9. The method of claim 7, further comprising smoothing a surface of the personalized digital foot model to remove concavities.

10. The method of claim 7, wherein the extendable mechanism functions along surfaces defined by dividing the parts.

11. The method of claim 7, wherein manufacturing the shoe-last parts comprises at least one of 3D printing, machine cutting, plastic deformation, deforming cutting or electrophysical machining.

12. The method of claim 7, wherein the shoe last parts are secured together by the extendable mechanism and movable relative to each other by the extendable mechanism.

13. A method of producing a shoe last for individual fitting and shaping of an inner surface of the shoe, the method comprising:

manufacturing a physical foot last based on a 3D scan of a user's foot, the physical foot last having at least four shoe-last parts defined by a vertical plane and a metatarsophalangeal joint extending transverse to the vertical plane;

inserting a extendable mechanism in a recess defined by at least the vertical plane between the shoe-last parts, the extendable mechanism comprising:

vertical and horizontal cylinders connected to the shoe-last parts;

a horizontal shaft connected to the vertical and horizontal cylinders and rotatable to move the vertical and horizontal cylinders thereby moving the shoe-last parts relative to each other for personal fitting and shaping of an inner surface of the shoe.

14. The method of claim 13, wherein manufacturing the shoe-last parts comprises by at least one of 3D printing, machine cutting, plastic deformation, deforming cutting or electrophysical machining.

15. The method of claim 13, wherein the at least four shoe-parts comprise right and left toe area parts defined forward of the metatarsophalangeal joint and right and left foreparts defined reward of the metatarsophalangeal joint.

* * * * *